July 21, 1942.  M. CARTER  2,290,622
METHOD OF MANUFACTURING CELLULAR RUBBER
Filed April 19, 1940

*Fig. 1.*

| FROTHING LATEX TO A DENSITY SLIGHTLY BELOW THAT ULTIMATELY DESIRED. |

| MIXING BLOWING AGENTS WITH THE FROTHED LATEX |

| PARTLY FILLING A MOLD WITH THE FROTHED LATEX |

| HEATING THE FROTHED LATEX TO BLOW OUT THE FROTH AND FILL THE MOLD |

| GELLING THE FROTHED LATEX |

| VULCANIZING THE GELLED FROTH |

*Fig. 2.*

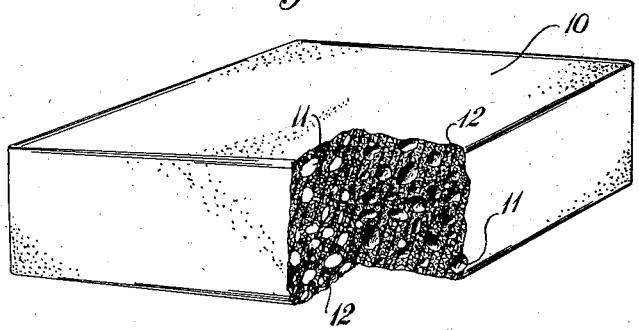

INVENTOR
Mitchell Carter
BY  Ely & Frye
ATTORNEYS

Patented July 21, 1942

2,290,622

UNITED STATES PATENT OFFICE 2,290,622

METHOD OF MANUFACTURING CELLULAR RUBBER

Mitchell Carter, Trenton, N. J., assignor to The Firestone Tire & Rubber Company, Akron, Ohio, a corporation of Ohio Application April 19, 1940, Serial No. 330,541

7 Claims. (Cl. 18—53)

This invention relates to the production of articles from rubber dispersions, especially to methods of producing molded cellular rubber articles from rubber dispersions.

Heretofore cellular rubber has been produced from rubber dispersions by numerous methods, among which is the method comprising adding frothing and stabilizing agents to the rubber dispersions, frothing the stabilized rubber dispersion, and then gelling and vulcanizing the froth to produce cellular rubber, as taught in U. S. Patent No. 1,852,447 issued to Chapman et al. Another method of producing cellular rubber from rubber dispersions is by the use of blowing agents, which is covered in Schidrowitz U. S. Patent No. 1,156,184. These blowing ingredients are added to the rubber dispersion to produce gases by chemical action and froth the rubber dispersion which thereafter is gelled and vulcanized in a suitable manner. Rubber dispersions also may be frothed by dissolving gases therein under pressure and thereafter reducing the pressure upon the rubber dispersion whereupon the gases effect frothing, as disclosed in Ogilby U. S. Patent No. 2,126,273. Still another method of frothing rubber dispersions and producing cellular rubber comprises frothing the rubber dispersion in the absence of any foam forming or stabilizing ingredients by simultaneously whipping and blowing air or gas through the rubber dispersion, adding a gelling agent and an activator to the frothed rubber dispersion and vulcanizing.

Substantially all previously known methods of forming cellular rubber have not been completely satisfactory in certain ways, one particular difficulty being the formation of molded articles that conform exactly to the mold contour. Of course, the rubber dispersion must be placed in the mold while in fluid condition and, in attempting to obtain a properly contoured molded article which completely fills the mold, the mold usually would be filled to overflowing with the fluid rubber dispersion. However, after gelling the rubber dispersion, the rubber mass obtained frequently did not fill the mold due to premature gelling and shrinkage occurring during gellation. Also, pools of water might collect on the surfaces of the gelled cellular rubber, or water or condensed steam leak into the mold through vents or joints therein and cause uncured spots in the cellular rubber, or other defects occur so that the article obtained from the mold would not identically conform to the mold contour. Obviously this is highly objectionable, since such articles would not be commercially satisfactory until further processed or repaired in some manner. Also, overflowing the molds with rubber dispersion is highly undesirable, since the rubber dispersion forced from the molds sets up or gels very rapidly. This means that the overflow dispersion cannot be molded to form any commercial article and usually ends up as scrap material.

The general object of this invention is to provide a novel, improved method of manufacturing cellular rubber articles and produce uniform molded cellular rubber articles which conform substantially exactly to the mold contour and have smooth surfaces, which articles are produced with minimum labor and production expense.

The invention also has as an object the provision of a method for completely filling molds with cellular sponge rubber of the desired density and for making a new type of cellular rubber.

Further objects of the invention are to provide an economical method of producing cellular rubber articles from latex; and to eliminate the formation of scrap in the production of cellular rubber.

The above and further objects will be made apparent in the following specification.

Broadly speaking, the present invention comprises beating and/or aerating rubber dispersions, after which desired amounts of compounding and blowing agents are usually added thereto and mixed therewith. This froth is then placed in molds wherein at least a portion of the cells of the froth are enlarged by a blowing action to increase the volume thereof so as to fill the mold completely before the froth is gelled. Thereafter the latex rubber is vulcanized to produce a molded cellular rubber article. The amount of blowing agent in the latex poured into the mold is sufficient that the latex will be blown out to fill the mold completely before gelling and will be forced against the mold surfaces by slight pressure during the vulcanization thereof. This blowing action is thought to form secondary cells in the walls of the primary cells first produced in the froth.

The invention will be described with reference to the accompanying drawing in which:

Figure 1 is a flow diagram of one embodiment of the invention; and

Figure 2 is a perspective view of a block of cellular rubber, partially shown in enlarged section, made by practice of the invention.

Practice of the present invention will be described with reference to latex, although it will be understood that this term is used in its broadest sense, and includes both natural and artificial dispersions of rubber or synthetic rubber or rubber-like substances, whether vulcanized or unvulcanized.

In one specific embodiment of the invention, the latex is mechanically frothed, and usually simultaneously aerated, to a density slightly below that desired in the article ultimately made therefrom, which frothing is effected in a suitable beater unit. In this instance the beating operation is carried out upon latex to which no compounding or stabilizing ingredients have been added. When the latex has been frothed to the desired volume, which is dependent upon the density of sponge rubber desired to be produced, the compounding, blowing, gelling and vulcanizing ingredients are added to and mixed with the froth. These ingredients may be in a pigment and curing paste prepared from the following ingredients in the amounts given:

| | |
|---|---|
| Water | 50.80 |
| Stablex B | .57 |
| "Pip-pip" | 4.32 |
| Zenite | 5.75 |
| Zinc oxide | 20.69 |
| Sulfur | 10.06 |
| G. Calcosal | 1.14 |
| R. Calcosal | .86 |
| Agerite white | 5.73 |

This paste was prepared by heating the water to 180° F. and dissolving the "Stablex B" therein, after which the accelerator "Pip-pip" (piperdinium pentamethylene dithiocarbamate) was dissolved in the heated solution. Then the prepared solution was placed in a ball mill and the remaining dyes (Calcosals), vulcanizing materials (sulfur, zinc oxide and "Zenite," which is zinc mercaptobenzothiazole) and pigment, "Agerite white" (which is dibeta-naphthyl-para-phenylene-diamine), were added thereto and the mixture was milled for about twenty-four hours. The ball mill was filled to maximum capacity to prevent foaming during this operation. To prepare the master batch in its final form wherein all the desired ingredients are present, 100.00 lbs. of the paste prepared as above has added thereto 7.16 lbs. of aqua ammonia of 28% ammonia content. Then 2.50 lbs. of a 50% ammonium nitrate aqueous solution, 7.17 lbs. of sodium bicarbonate, 3.58 lbs. of sodium aluminum sulfate, and 3.58 lbs. of calcium acid phosphate were added to serve as a heat sensitive gelling agent for the latex, the latter three substances being mixed and sold, in substantially the portions indicated, as a baking powder which is thought to function as a "blowing" material for the latex. The entire mixture was thoroughly stirred until a smooth dispersion was formed. Thus the resultant product contains the fillers, dyes, gelling agent, blowing and the vulcanizing materials which are desired in the production of the resultant cellular rubber article. The aqua ammonia stabilizes the blowing agent against action until the latex is heated, which drives off the ammonia and permits a blowing action to be effected. Of course, the specific compounding materials and amounts thereof may vary widely and still be within the scope of the invention. Also, the latex may be frothed initially in any desired manner, and thereafter be blown out to the desired density.

After beating the latex to the desired volume, a portion of the master batch prepared as above outlined was added to the frothed latex and thoroughly mixed therewith. For an original batch of 10 lbs. of latex, 28.8 ounces of master batch was added thereto after the latex was frothed to about six times its original volume. Next the frothed compounded latex is poured into the cavity of a mold which preferably is warmed to a temperature from 125° to 170° F. Then a cover having only pin sized vent holes therein is placed upon the mold whereby entrapped air only and no frothed latex can escape from the mold, the latex gelling as soon as it enters the vent holes. The action of the gelling agents may be speeded up by inserting the mold into an oven which is heated to about 190° to 200° F. and permitted to remain therein for about ten minutes. The heating of the frothed latex apparently frees gases from the blowing agents and, in all events, expands the frothed rubber to fill the mold completely with cellular latex under slight pressure. This pressure is maintained until a stiff gel is secured by action of the gelling agents, which appear to be heat sensitive due to the compounds in the blowing agent. The cellular rubber produced in gelling the latex can be vulcanized by heating the mold containing same to 212° F. and retaining it at that temperature for about sixty minutes, or by subjecting the mold to steam under pressure for a time dependent upon the temperature and pressure of the steam. Then the resultant article is washed and dried in accordance with standard practice.

In the practice of the present invention it will be understood that the foregoing compounding master batch is prepared for a specific type of cellular rubber. That is, the density desired in the final cellular rubber article will vary with the rapidity of gelling, and also with the ratio or percentage increase in volume of the latex after same is frothed. The frothed latex is placed into the mold as soon as possible after the compounding ingredients are added thereto and a distinct feature of the invention resides in frothing the latex and then expanding the frothed latex to form porous rubber of lower density than the froth. The mold in which the froth is poured is closed so that the expansion of the frothed latex will completely fill the mold cavity with cellular rubber under slight pressure whereby the production of articles of the exact mold contour is made possible. That is, the cellular rubber produced is retained in contact with the mold surfaces during vulcanization, whereas ordinary frothed latex placed in the mold usually shrinks from the mold surfaces after it gels.

Figure 2 shows cellular rubber as made in accordance with the present invention. This rubber 10 is made from countless interconnected primary cells 11, the walls of which have secondary cells 12 formed therein by the blowing action or by the beating action. The size of the cells 11 is increased by the blowing action on the latex froth which may also form a portion of the secondary cells in the walls of the primary cells 11.

It has been found that practice of the present invention uses less amounts of latex to produce the same type of article than previous methods of producing cellular rubber. This is due to elimination of overflow losses from the mold and to the formation of the combination of primary and secondary cells in the cellular rubber. No soaps, proteins, gums, oils, waxes or other frothing or stabilizing ingredients are employed in the above example, but these may be used, if desired. Articles produced in accordance with the invention are found to have very desirable physical properties insofar as the aging, permanent set, tensile strength, and compressibilty are concerned. It will be apparent that, in some cases, it may be desirable to use the present invention in forming sheet cellular rubber or other non-molded rubber. However, the invention is particularly adapted to form molded cellular rubber articles.

It will be appreciated that the foregoing description of the invention is for illustrative purposes only, and that the scope of the invention includes modifications thereof such as come under the appended claims.

What is claimed is:

1. That method of making cellular rubber articles from aqueous rubber dispersions, which method comprises frothing the rubber dispersion, mixing compounding, vulcanizing, blowing and gelling materials with the frothed rubber dispersion, said blowing material being activated upon heating of same, pouring the frothed rubber dispersion into a mold until the mold is almost filled, heating the frothed rubber dispersion to activate the blowing material to expand the frothed rubber dispersion and fill the mold completely, the rubber dispersion being gelled by the heating action, vulcanizing the gelled rubber dispersion to produce a molded cellular article of the desired shape, and washing and drying the cellular rubber article.

2. In a method of making molded cellular rubber articles, the steps of frothing the latex to a density slightly greater than that required in the final article, the frothed latex having a heat sensitive gelling and a blowing agent therein, placing the frothed latex in a mold in less volume than the mold, heating the frothed latex to activate the blowing material to expand same until it completely fills the mold, and continuing the heating to gel the froth.

3. In a method of making molded cellular rubber articles, the steps of frothing the latex to a density slightly greater than that required in the final article, mixing with the frothed latex a blowing and gelling agent comprising a mixture of sodium bicarbonate, sodium aluminum sulfate and calcium acid phosphate, pouring the frothed latex into a mold until the mold is nearly filled, immediately heating the mold to activate the blowing material to expand the frothed latex and completely fill the mold, the frothed latex being gelled to form cellular rubber when in its expanded condition, and vulcanizing the cellular rubber to produce a molded article which exactly conforms to the mold cavity.

4. Cellular rubber comprising rubber having a substantially uniform distribution of a multitude of interconnected relatively large primary cells formed therein and relatively small secondary cells formed in the walls of the primary cells.

5. A method of making molded cellular rubber articles from rubber dispersions, said method comprising the steps of frothing a rubber dispersion to form a froth of slightly higher density than that desired, a gelling and a blowing agent being present in the dispersion and the blowing agent being stabilized against blowing action at room temperature by a volatile stabilizer, placing the froth in a mold to nearly fill same with froth, heating the froth to drive the volatile stabilizer from the dispersion and to activate the blowing agent and blow out the froth to fill the mold completely, and continuing the heating of the froth to gel and vulcanize same and form cellular rubber of the desired density therefrom, the froth being forced out to fill the mold completely while being gelled and vulcanized.

6. In a method of making molded cellular rubber articles from rubber dispersions, the steps of frothing a rubber dispersion to form a froth therefrom, a blowing agent being present in the dispersion and being stabilized against action at room temperature by a stabilizer removable therefrom by heating same, placing the froth in a mold to nearly fill same with froth, and heating the froth to drive the stabilizer from the dispersion and to blow out the froth to fill the mold completely.

7. A molded cellular rubber article comprising rubber having a substantially uniform distribution of a multitude of interconnected relatively large cells formed therein and relatively small cells formed in the walls of the large cells.

MITCHELL CARTER.

CERTIFICATE OF CORRECTION.

Patent No. 2,290,622. July 21, 1942.

MITCHELL CARTER.

It is hereby certified that error appears in the printed specification of the above numbered patent requiring correction as follows: Page 2, second column, line 3, for "28.8" read --20.8--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.